United States Patent
Tian et al.

(10) Patent No.: US 11,352,080 B2
(45) Date of Patent: Jun. 7, 2022

(54) SYSTEM AND METHOD FOR ASSEMBLING DOUBLE-DECK VEHICLE BODY

(71) Applicant: CRRC TANGSHAN CO., LTD., Tangshan (CN)

(72) Inventors: Xinli Tian, Tangshan (CN); Wenzhong Liang, Tangshan (CN); Xiaozhong Feng, Tangshan (CN); Dongjun Liu, Tangshan (CN); Mingwei Zhang, Tangshan (CN); Wenxiao Wang, Tangshan (CN); Mao Mao, Tangshan (CN)

(73) Assignee: CRRC TANGSHAN CO., LTD., Tangshan (CN)

( * ) Notice: Subject to any disclaimer, the term of this patent is extended or adjusted under 35 U.S.C. 154(b) by 217 days.

(21) Appl. No.: 16/791,847

(22) Filed: Feb. 14, 2020

(65) Prior Publication Data

US 2020/0180715 A1 Jun. 11, 2020

Related U.S. Application Data

(63) Continuation of application No. PCT/CN2017/117620, filed on Dec. 21, 2017.

(30) Foreign Application Priority Data

Aug. 14, 2017 (CN) .......................... 201710693833.4

(51) Int. Cl.
*B62D 65/02* (2006.01)
*B62D 31/04* (2006.01)

(52) U.S. Cl.
CPC ........... *B62D 65/024* (2013.01); *B62D 31/04* (2013.01)

(58) Field of Classification Search
CPC ...... B62D 65/024; B62D 31/04; B62D 31/02; B62D 65/02; B62D 65/026; B60Y 2200/30
See application file for complete search history.

(56) References Cited

U.S. PATENT DOCUMENTS 4,033,033 A * 7/1977 Heffner .................. B62D 65/02
29/824
4,667,866 A * 5/1987 Tobita .................. B23K 37/047
219/79

(Continued)

FOREIGN PATENT DOCUMENTS

| CN | 101624073 A | 1/2010 |
| CN | 101624073 B | 2/2011 |

(Continued)

OTHER PUBLICATIONS

The EESR of EP application No. 17921832.6.

(Continued)

*Primary Examiner* — Ryan J. Walters
(74) *Attorney, Agent, or Firm* — J.C. Patents (57) ABSTRACT

Provided are a system and a method for assembling a double-deck vehicle body. The system includes a vehicle body chassis support and an upper floor support. The vehicle body chassis support includes a crossbeam, end supports, and an intermediate support, where the end supports are arranged separately at two ends of the crossbeam, the intermediate support is arranged at the middle of the crossbeam, a height of the end supports is greater than a height of the intermediate support, an upper surface of the end supports and an upper surface of the intermediate support are configured to be closely fitted to a lower surface of a vehicle body chassis; and the upper floor support is detach- (Continued)

ably arranged on a vehicle body chassis for supporting an upper floor of the vehicle body.

10 Claims, 8 Drawing Sheets

(56) References Cited

U.S. PATENT DOCUMENTS

| | | | | |
|---|---|---|---|---|
| 5,027,502 | A | * | 7/1991 | Sakamoto ............. B62D 65/12 |
| | | | | 29/783 |
| 9,493,201 | B2 | * | 11/2016 | Kilibarda ............. B62D 65/022 |
| 9,815,511 | B2 | * | 11/2017 | Kilibarda ............. B62D 65/024 |
| 2011/0265301 | A1 | * | 11/2011 | Kilibarda ............. B62D 65/18 |
| | | | | 29/407.01 |
| 2015/0246700 | A1 | | 9/2015 | Kilibarda et al. |

FOREIGN PATENT DOCUMENTS

| | | |
|---|---|---|
| CN | 102120470 A | 7/2011 |
| CN | 202162519 U | 3/2012 |
| CN | 202846091 U | 4/2013 |
| CN | 104097009 A | 10/2014 |
| CN | 205465154 U | 8/2016 |
| CN | 107458501 A | 12/2017 |
| DE | 102013112152 | 5/2015 |
| GB | 1134945 A | 11/1968 |
| JP | 2011-005948 A | 1/2011 |
| WO | WO2009132363 A1 | 10/2009 |

OTHER PUBLICATIONS

The Chinese International Search Report of corresponding International application No. PCT/CN2017/117620, dated May 18, 2018.
The Chinese First Examination Report and Search Report of corresponding Chinese application No. 201710693833.4, dated Jan. 9, 2019.

* cited by examiner

SYSTEM AND METHOD FOR ASSEMBLING DOUBLE-DECK VEHICLE BODY

CROSS-REFERENCE TO RELATED APPLICATION

This application is a continuation of International Application No. PCT/CN2017/117620, filed on Dec. 21, 2017, which claims priority to Chinese Patent Application No. 201710693833.4, filed on Aug. 14, 2017. All of the aforementioned patent applications are hereby incorporated by reference in their entireties.

TECHNICAL FIELD

The present disclosure relates to the field of rail vehicle assembly and, in particular, to a system and a method for assembling a double-deck vehicle body.

BACKGROUND

In present rolling stock industry, an aluminum alloy vehicle body, which includes a chassis, a left wall, a right wall, a roof and an end wall (or plus a driver's cab if it is a locomotive), has a single-deck structure. The vehicle body is provided internally with a wooden floor and vehicle interiors. Seats are also provided for carrying passengers or objects. Should the single-deck vehicle body be used to alleviate the burden of the heavy passenger flow both home and abroad, the mileage of the railway will need to be increased, which will involve not only heavy investments, but also more occupied farmland. Instead, if a double-deck vehicle body is used, its large capacity can increase the passenger capacity by more than 45% and reduce the operating cost by 25% as compared with a single-deck train of the same length, and with less investment and without more occupied farmland, which is beneficiary to the transportation service for the rapidly increasing number of commuters in the city.

However, at present, there is no complete and sophisticated process for assembling a double-deck vehicle body in our country. In the prior art, a single-deck vehicle body chassis can be well supported during single-deck vehicle body assembly because the lower surface and the supported upper part of the single-deck vehicle body chassis are both flat. Instead, a double-deck vehicle body chassis is low in the middle, high on both sides, and the middle part is U-shaped. Therefore, the two sides of the double-deck vehicle body chassis cannot be supported using the same chassis support for assembling the single-deck vehicle body because the middle portion of the flat chassis support will interfere with the U-shaped vehicle body chassis.

Based on the above-mentioned problems, the present disclosure proposes a system and a method for assembling a double-deck car body.

SUMMARY

The present disclosure provides a system and a method for assembling a double-deck vehicle body, where the system for assembling a double-deck vehicle body meets a need for supporting the various heights of the lower surface of the double-deck vehicle body chassis, and can ensure the rigidity and strength requirements of the cross-section of the vehicle body during the assembly process.

An aspect of the present disclosure provides a system for assembling a double-deck vehicle body, including: a vehicle body chassis support and an upper floor support;

the vehicle body chassis support includes a crossbeam, end supports, and an intermediate support, where the end supports are arranged separately at two ends of the crossbeam, the intermediate support is arranged at the middle of the crossbeam, a height of the end supports is greater than a height of the intermediate support, an upper surface of the end supports and an upper surface of the intermediate support are configured to be closely fitted to a lower surface of a vehicle body chassis; and the upper floor support is detachably arranged on a vehicle body chassis for supporting an upper floor of the vehicle body.

The system for assembling a double-deck vehicle body as described above, where an upper part of the end support is arranged with a height adjustable screw.

The system for assembling a double-deck vehicle body as described above, where the crossbeam includes a first crossbeam and a second crossbeam arranged in parallel, and a plurality of connection crossbeams arranged in parallel between the first crossbeam and the second crossbeam; and the intermediate support is arranged on the connection crossbeams, the end supports are separately arranged on two ends of the first crossbeam and two ends of the second crossbeam.

The system for assembling a double-deck vehicle body as described above, where the upper floor support includes a chassis connection frame, an intermediate support frame, and an upper support frame, and a width of the chassis connection frame is smaller than a width of a vehicle body.

The system for assembling a double-deck vehicle body as described above, where the chassis connection frame includes a first upper frame and a first lower frame, which are connected through a first column, an end of the first upper frame is connected with an end of the first lower frame through a first reinforcing plate, a stiffening plate is arranged between the first upper frame and the first column, a connection block is arranged on a bottom of the first lower frame, a first connection plate is arranged on an upper part of the first upper frame, and a connection hole is arranged on the first connection plate;

a quantity of the intermediate support frames is two, which are separately located at two ends of an upper surface of the chassis connection frame, each intermediate support frame includes a second upper frame and a second lower frame, which are connected through second columns, a reinforcing rib is arranged between the second columns, a second reinforcing plate is arranged between the second column and the second upper frame, and between the second column and the second lower frame, a second connection plate is arranged at a lower part of the second lower frame, a third connection plate is arranged at an upper part of the second upper frame, and the second connection plate and the third connection plate are arranged with a connection hole;

an upper support frame is arranged on each of the intermediate support frames, and each upper support frame includes a fourth connection plate, an intermediate bracket, and a screw, where the fourth connection plate includes a bottom plate and a side plate, the bottom plate is arranged with a connection hole, the side plate is arranged with a groove, the intermediate bracket includes a support plate, and fifth connection plates located on both sides of the support plate, and the support plate engages with the groove of the side plate, and the screw is connected to the fifth connection plate through a bent connection plate.

The system for assembling a double-deck vehicle body as described above, where the fourth connection plate and the intermediate bracket are arranged with a weight reduction circular hole.

Another aspect of the present disclosure provides a method for assembling a double-deck vehicle body, where the method involves using the system for assembling a double-deck vehicle body as described above, and the method for assembling a double-deck vehicle body includes:

installing a vehicle body chassis on the vehicle body chassis support, so that both ends of the vehicle body chassis are supported by and in contact with ends of the vehicle body chassis support, and a middle of the vehicle body chassis is supported by and in contact with an intermediate support of the vehicle body chassis support;

arranging the upper floor support in a recessed portion of the vehicle body chassis;

arranging side walls on both sides of the vehicle body chassis, and an upper floor between two side walls;

adjusting a height of the upper floor support, so that an upper surface of the upper floor support is closely fitted to a lower surface of the upper floor;

installing a roof on top of the side walls, and adjusting heights of a first carriage deck and a second carriage deck; and removing the upper floor support.

The method for assembling a double-deck vehicle body as described above, where the quantity of the upper floor support is three, and the arranging the upper floor support in a recessed portion of the vehicle body chassis includes:

arranging the three upper floor supports at both ends and a middle, respectively, of the recessed portion of the vehicle body chassis.

The vehicle body chassis support of the system for assembling the double-deck vehicle body provided by the present disclosure includes the crossbeam, the end supports, and the intermediate support, where the end supports are taller than the intermediate support, thus offering stability to a vehicle body chassis during the assembly process of the double-deck body and providing support for other components. The upper floor support connects the vehicle body chassis and an upper floor during the assembly process of the double-deck vehicle body, providing support for the upper floor to ensure the strength and rigidity of the cross section of the vehicle body. Moreover, the upper floor support is easy to install and remove, and the width and height of the upper floor support is adjustable to the dimensions of the vehicle body structure, so as to be adaptable to the requirements of vehicle bodies of various dimensions.

BRIEF DESCRIPTION OF DRAWINGS

In order to explain clearly technical solutions of the embodiments of the present disclosure or the prior art, the drawings that will need to be used in the description of the embodiments or the prior art will be briefly introduced below. Obviously, the drawings in the following description are merely some embodiments of the present disclosure. For those skilled in the art, other drawings can be derived based on these drawings without paying any creative work.

DESCRIPTION OF EMBODIMENTS

In order to make the objectives, technical solutions, and advantages of the embodiments of the present disclosure clearer, the technical solutions in the embodiments of the present disclosure will be clearly and completely described with reference to the accompanying drawings in the embodiments of the present disclosure. Obviously, the described embodiments are a part but not all of the embodiments of the present disclosure. Based on the embodiments of the present disclosure, all other embodiments obtained by the skilled in the art without any creative work shall be within the scope of the present disclosure.

In the description of the present disclosure, it should be understood that the orientations or positional relationships indicated by the terms "up" and "down" are based on what are shown in the drawings, and are only for the convenience of describing the present disclosure and simplifying the description, rather than indicating or implying that the device or element have to have such a particular orientation, or have to be constructed and operated in such a particular orientation, and therefore should not be understood as a limitation to the disclosure. In addition, the terms "first," "second," "third," "fourth," and "fifth" are only used for descriptive purposes, and not to be interpreted as indicating or implying relative importance or implicitly indicating the number of technical features. Moreover, "a plurality" means two or more in the description of the present disclosure, unless otherwise stated.

A double-deck aluminum alloy vehicle body chassis is a structure depressed in the middle, raised on both sides, with a U-shaped middle part. Therefore, the two sides of the double-deck vehicle body chassis cannot be supported by the existing single-deck vehicle body chassis support, and the middle part of the horizontal chassis support will interfere with the U-shaped vehicle body chassis. Moreover, during the assembly process of the upper floor, the upper floor is prone to collapse and deformation, and cannot support the load of workers and materials when welding roofs and side walls. Accordingly, the present disclosure proposes a system and a method for assembling a double-deck car body.

Figure 1:
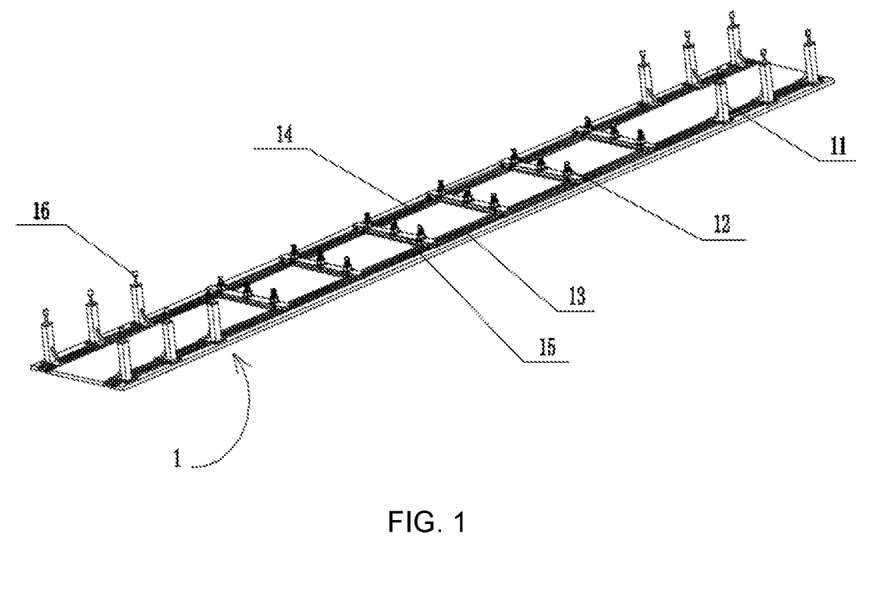
FIG. 1 is a schematic structural diagram of a vehicle body chassis support provided by an embodiment of a system and a method for assembling a double-deck vehicle body according to the present disclosure.
Figure 2:
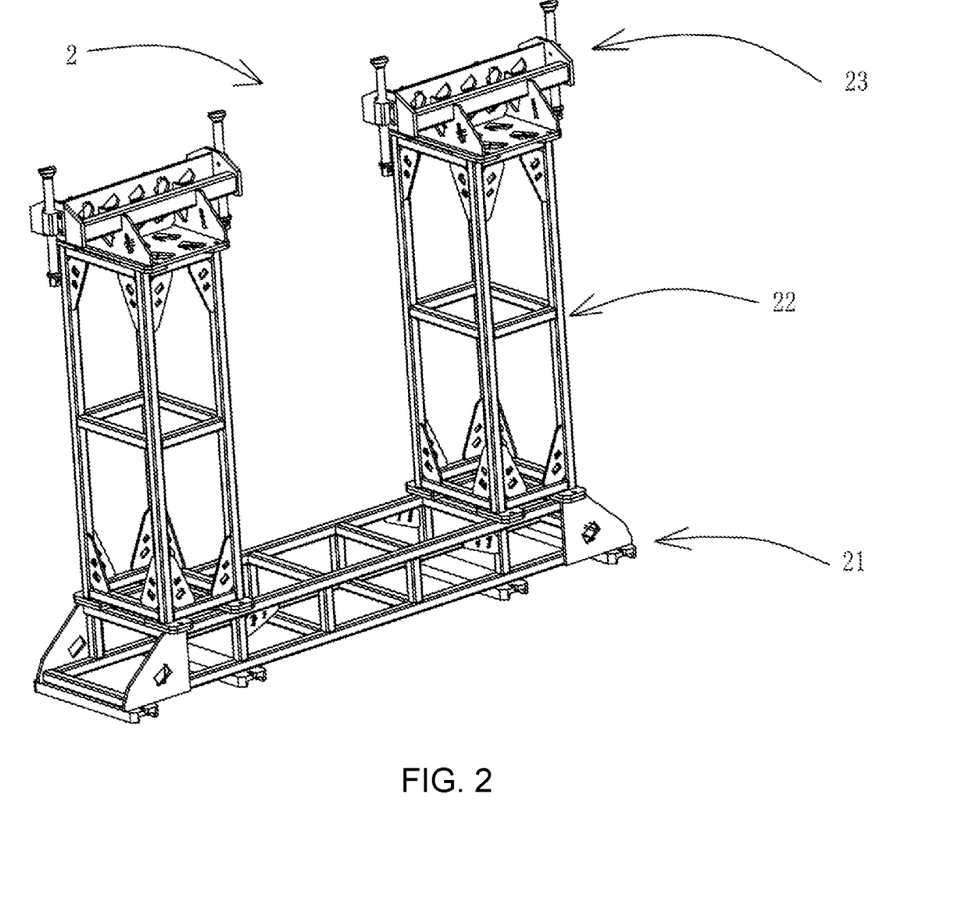
FIG. 2 is a schematic structural diagram of an upper floor support provided by an embodiment of a system and a method for assembling a double-deck vehicle body according to the present disclosure.
Figure 3:
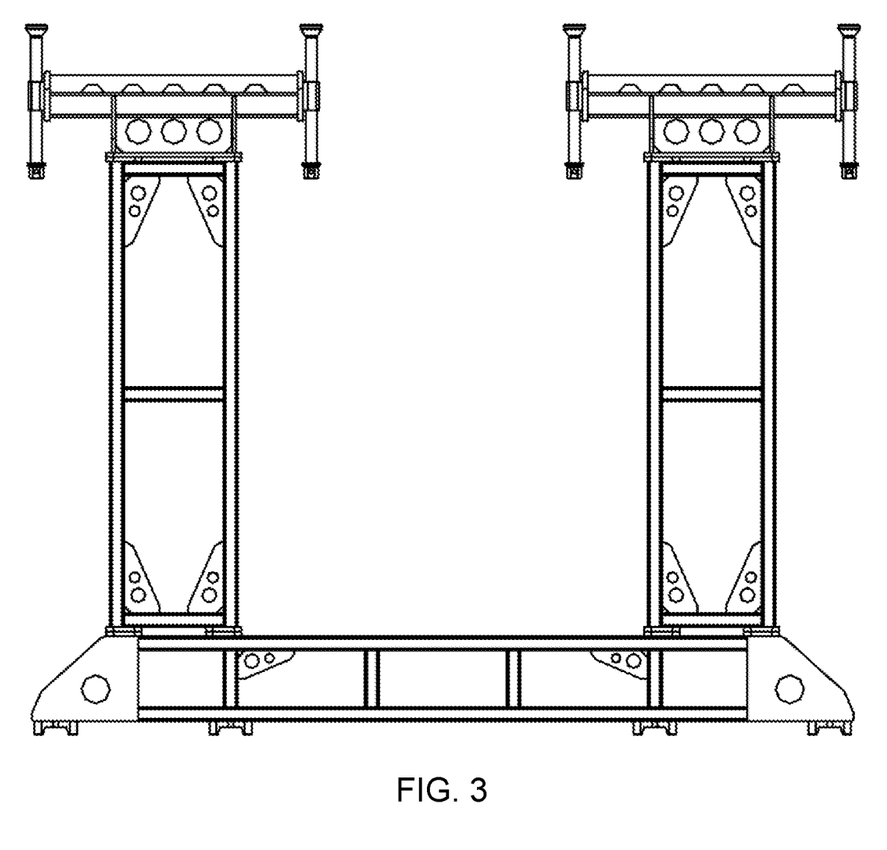
FIG. 3 is a front view of a structure for an upper floor support provided by an embodiment of a system and a method for assembling a double-deck vehicle body according to the present disclosure.

FIG. 1 is a schematic structural diagram of a vehicle body chassis support provided by an embodiment of a system and a method for assembling a double-deck vehicle body according to the present disclosure, FIG. 2 is a schematic structural diagram of an upper floor support provided by an embodiment of a system and a method for assembling a double-deck vehicle body according to the present disclosure, and FIG. 3 is a front view of a structure for an upper floor support provided by an embodiment of a system and a method for assembling a double-deck vehicle body according to the present disclosure. As shown in FIG. 1 and FIG. 2, a system for assembling a double-deck vehicle body of according to an embodiment of the present disclosure includes: a vehicle body chassis support 1 and an upper floor support 2.

The vehicle body chassis support 1 includes a crossbeam, an end support 11, and an intermediate support 12, where two ends of the crossbeam are respectively arranged with an end support 11, and the middle of the crossbeam is arranged the intermediate support 12; the height of the end support 11 is greater than that of the intermediate support 12; the upper surface of the end support 11 and the upper surface of the intermediate support 12 are configured to be closely fitted to the lower surface of the vehicle body chassis; and the upper floor support 2 is detachably arranged at the vehicle body chassis for supporting the upper floor of the vehicle body.

In the present disclosure, the height of the end support 11 is greater than the height of the intermediate support 12 by a difference that equals to a difference between the heights of the two sides and the middle of the lower surface of the vehicle body chassis. The difference between the heights of the end support 11 and the intermediate support 12 depends on the specific condition of the vehicle body chassis.

The length of the crossbeam of the present disclosure is determined by the length of the vehicle body chassis. The quantity and occupied length of the end supports 11 are determined by the length of the two sides of the vehicle body chassis. The quantity and occupied length of the intermediate supports 12 are determined by the length of the middle of the vehicle body chassis.

The vehicle body chassis support of the system for assembling a double-deck vehicle body provided by the present disclosure includes the crossbeam, the end support, and the intermediate support. The end support has a greater height than the intermediate support, which can stabilize the double-deck vehicle body during the assembly process thereof and provides support for other components. The upper floor support connects the vehicle body chassis and the upper floor during the assembly process of the double-deck vehicle body, thereby supporting the upper floor to ensure the strength and rigidity of the cross section of the vehicle body.

Now, the system for assembling a double-deck vehicle body of the present disclosure will be described in detail in conjuncture with specific embodiments.

The crossbeam includes a first crossbeam 13 and a second crossbeam 14 arranged in parallel, with a plurality of connection crossbeams 15 arranged in parallel between the first crossbeam 13 and the second crossbeam 14. The connection crossbeam 15 is arranged the intermediate support 12, two ends of the first crossbeam 13 are arranged the end supports 11, and two ends of the second crossbeam 14 are arranged the end supports 11, respectively.

The middle part of the double-deck aluminum alloy vehicle body chassis is a U-shaped structure. The first beam 13 and the second beam 14 are used to support both sides of the U-shaped vehicle body chassis, and the connection beam 15 is used to support the middle of the U-shaped floor. In this embodiment, the quantity of connection beams 15 is six, and the distance between two adjacent connection beams 15 is 2.5 meters. The connection beams 15 are evenly distributed along the longitudinal direction of the vehicle body. The quantity and spacing of the connection beams 15 are based on the length of the middle part of the bottom of the vehicle body and the embodiment, and are not particularly limited herein.

Furthermore, an upper part of the end support 11 is arranged a height adjustable screw 16. The screw 16 is provided so that the end support 11 may have some adjustability, and a worker can fine-tune the screw 16 to ensure that the end support 11 is in close contact with both sides of the vehicle body chassis.

The upper floor support 2 includes a chassis connection frame 21, an intermediate support frame 22, and an upper support frame 23, and the width of the chassis connection frame 2 is narrower than that of the vehicle body. The upper floor support 2 is used to support the upper floor, assembling workers and equipment on the upper floor during the assembly work. The vehicle body chassis connecting frame 21 is located on the vehicle body chassis, the intermediate support frame 22 is located on the vehicle body chassis connecting frame 21, and the upper support frame 23 is located on the intermediate support frame 22. The upper floor support 2 is a combined structure of the vehicle body chassis connecting frame 21, the intermediate support frame 22, and the upper support frame 23, and the three are detachably connected, which is convenient for assembly and use in the compartment of the carriage.

Figure 4:
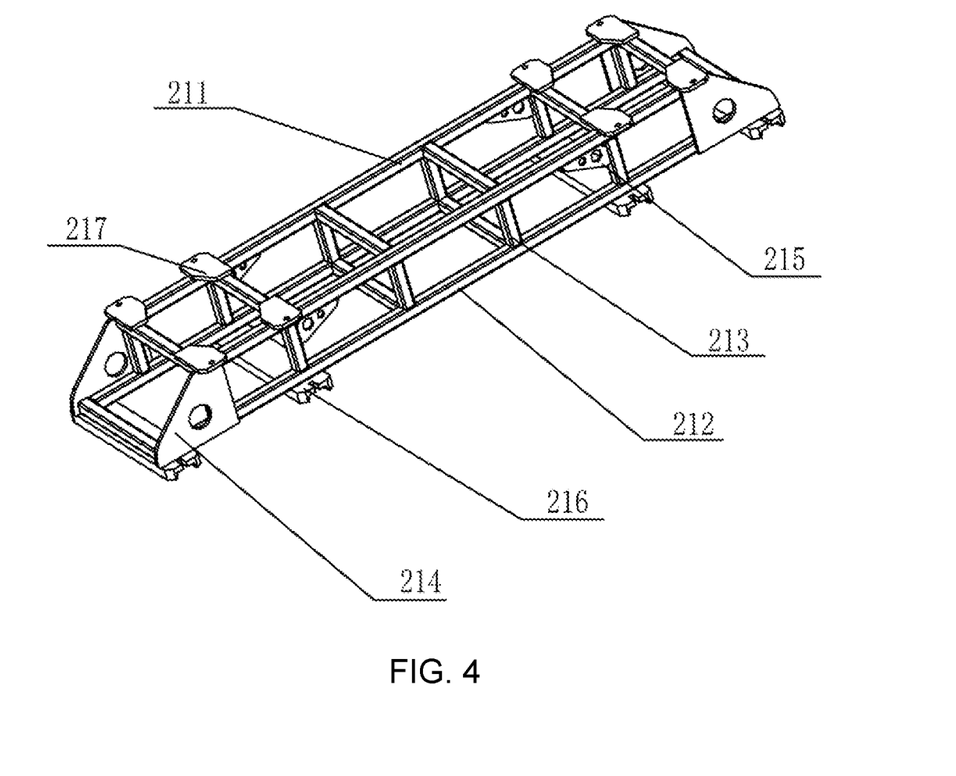
FIG. 4 is a schematic structural diagram of a chassis connection frame provided by an embodiment of a system and a method for assembling a double-deck vehicle body according to the present disclosure.
Figure 5:
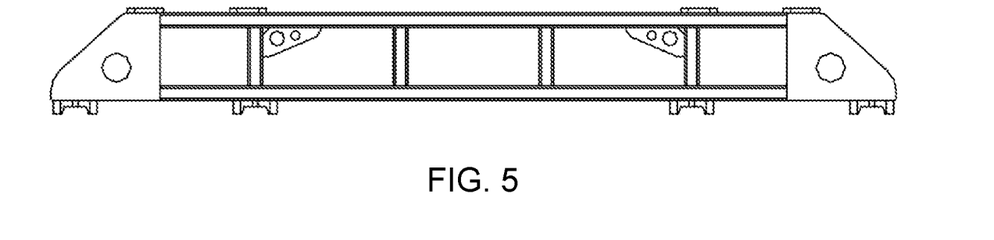
FIG. 5 is a front view of the chassis connection frame provided by an embodiment of a system and a method for assembling a double-deck vehicle body according to the present disclosure.

FIG. 4 is a schematic structural diagram of a chassis connection frame provided by an embodiment of a system and a method for assembling a double-deck vehicle body according to the present disclosure, and FIG. 5 is a front view of the chassis connection frame provided by the embodiment of a system and a method for assembling a double-deck vehicle body according to the present disclosure. As shown in FIG. 4 and FIG. 5, the chassis connection frame 21 includes a first upper frame 211 and a first lower frame 212, which are connected through a first column 213. An end of the first upper frame 211 is connected with that of the first lower frame 212 through a first reinforcing plate 214. A stiffening plate 215 is arranged between the first upper frame 211 and the first column 213. A connection block 216 is arranged at the bottom of the first lower frame 212. A first connection plate 217 is arranged at the upper part of the first upper frame, and is provided with a connection hole.

Figure 6:
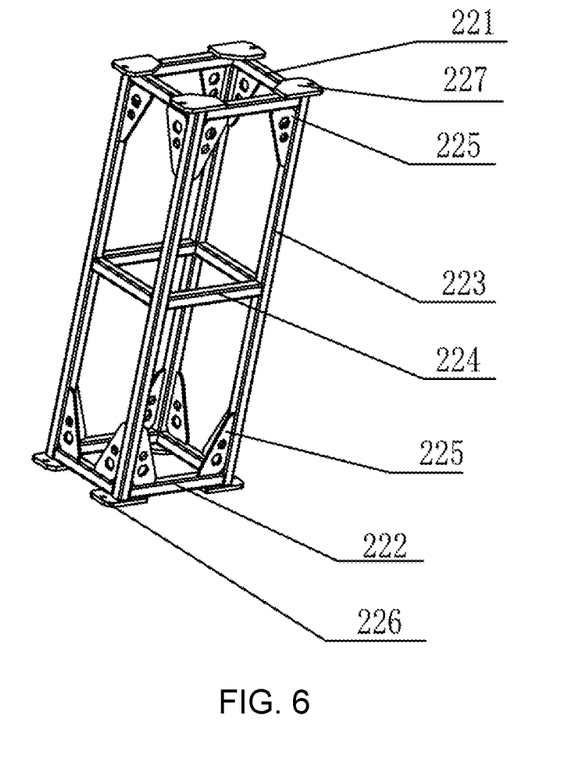
FIG. 6 is a schematic structural diagram of an intermediate support frame provided by an embodiment of a system and a method for assembling a double-deck vehicle body according to the present disclosure.
Figure 7:
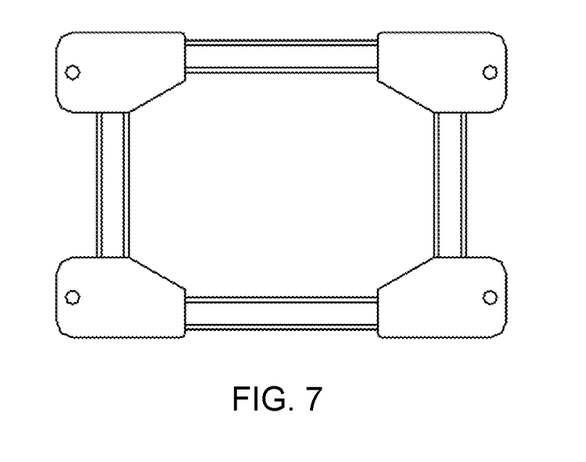
FIG. 7 is a top view of an intermediate support frame provided by an embodiment of a system and a method for assembling a double-deck vehicle body according to the present disclosure.

FIG. 6 is a schematic structural diagram of an intermediate support frame provided by an embodiment of a system and a method for assembling a double-deck vehicle body according to the present disclosure, and FIG. 7 is a top view of an intermediate support frame provided by an embodiment of a system and a method for assembling a double-deck vehicle body according to the present disclosure. As shown in FIG. 6 and FIG. 7, the quantity of the intermediate support frames 22 is two, which are respectively located at both ends of the upper surface of the chassis connection frame 21. Each of the intermediate support frames 22 includes a second upper frame 221 and a second lower frame 222, which are connected by a second column 223. A reinforcing rib 224 is arranged between the second column 223. A second reinforcing plate 225 is arranged between second columns 223 and the second upper frame 221, and between the second columns 223 and the second lower frame 222. A second connection plate 226 is arranged at a lower part of the second lower frame 222. A third connection plate 227 is arranged at an upper part of the second upper frame 221. The second connection plate 226 and the third connection plate 227 are arranged with a connection hole.

The connection between the intermediate support frame 22 and the chassis connection frame 21 is implemented by bolts passing through the connection holes of the first connection plate 217 and the second connection plate 226.

Figure 8:
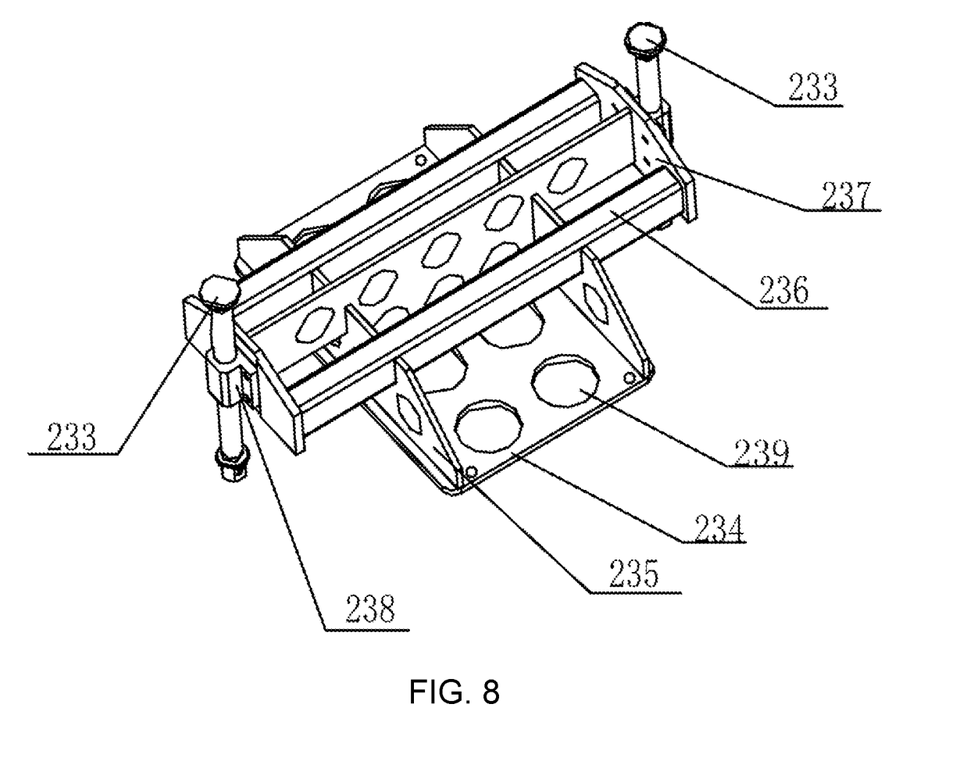
FIG. 8 is a schematic structural diagram of an upper support frame provided by an embodiment of a system and a method for assembling a double-deck vehicle body according to the present disclosure.
Figure 9:
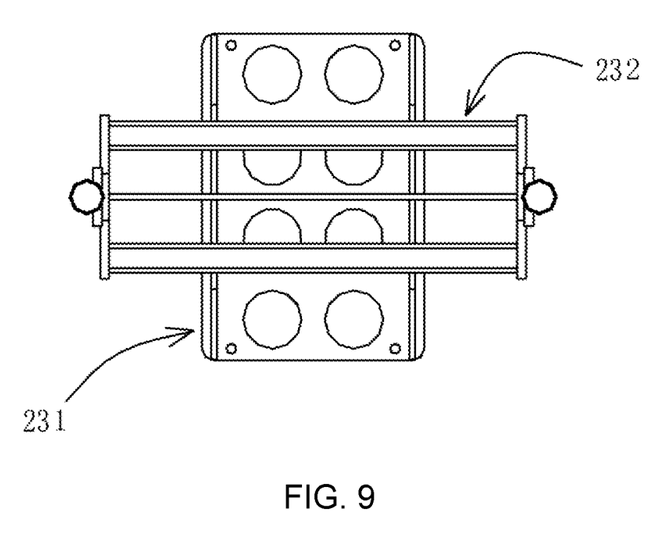
FIG. 9 is a top view of an upper support frame provided by an embodiment of a system and a method for assembling a double-deck vehicle body according to the present disclosure.

FIG. 8 is a schematic structural diagram of an upper support frame provided by an embodiment of a system and a method for assembling a double-deck vehicle body according to the present disclosure, and FIG. 9 is a top view of an upper support frame provided by an embodiment of a system and a method for assembling a double-deck vehicle body according to the present disclosure. As shown in FIG. 8 and FIG. 9, each of the intermediate support frames 22, is arranged on top with an upper support frame 23, and each of the upper support frames 23 includes a fourth connection plate 231, an intermediate bracket 232, and a screw 233. The fourth connection plate 231 includes a bottom plate 234 and a side plate 235. The bottom plate 234 is arranged with a connection hole. The side plate 235 is arranged with a groove. The intermediate bracket 232 includes a support plate 236, and fifth connection plates 237 located on both ends of the support plate 236, and the support plate 236 engages with, and is welded to, the groove of the side plate 235. The screw 233 is connected to the fifth connection plate 237 through a bent connection plate 238.

The connection between the upper support frame 23 and the middle support frame 22 is connected by a bolt passing through the connection holes of the third connection plate 227 and the bottom plate 234.

Further, the fourth connection plate 231 and the intermediate bracket 232 are arranged with a weight reduction circular hole 239.

In the embodiment of the present disclosure, the upper floor support 2 is realized by one chassis connection frame 21, two intermediate support frames 22, and two upper support frames 23, all of which joined by bolts, which facilitates installation and disassembly during the assembly process of the vehicle body. Moreover, by adapting the height of the second column 223 in the middle support frame 22 to the variations in the height of the upper floor, the fine adjustment of the height direction of the upper floor support 2 can be achieved by adjusting the height of the screw 233 in the upper support frame 23.

Figure 10:
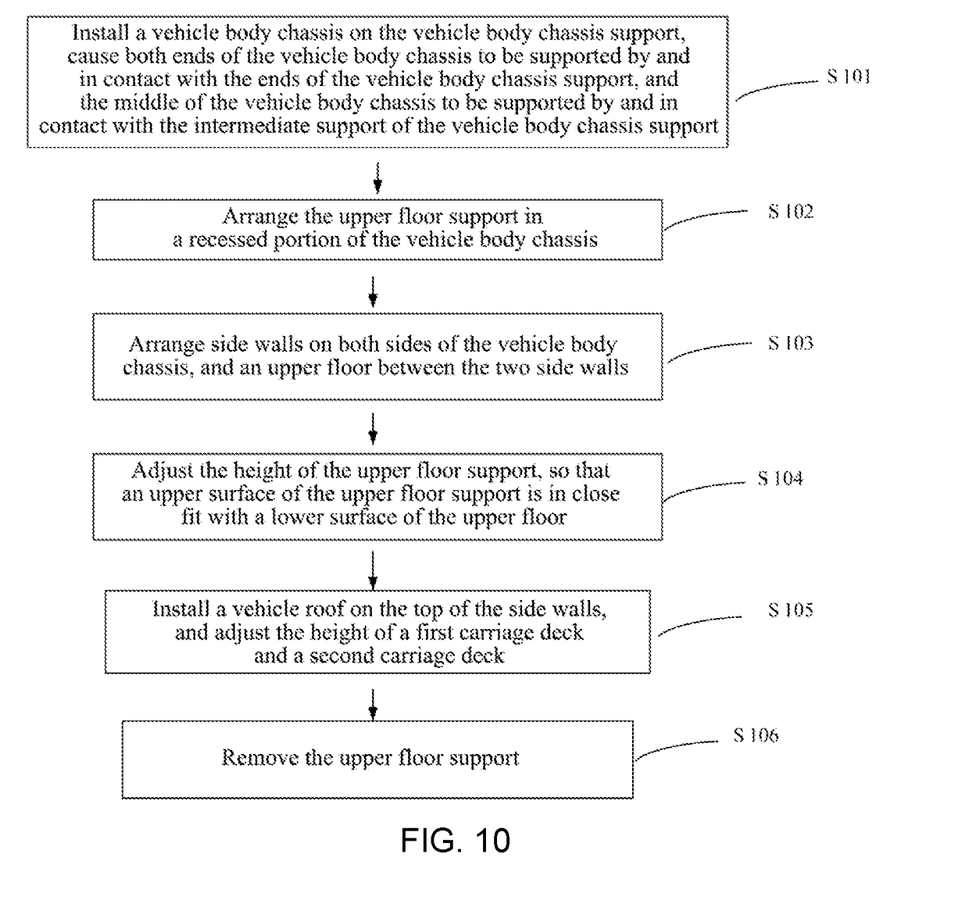
FIG. 10 is a flowchart of a method for assembling a double-deck vehicle body provided by an embodiment of a system and a method for assembling a double-deck vehicle body according to the present disclosure.

A method for assembling a double-deck vehicle body is provided by another aspect of the present disclosure. FIG. 10 is a flowchart of a method for assembling a double-deck vehicle body provided by an embodiment of a system and a method for assembling a double-deck vehicle body according to the present disclosure. As shown in FIG. 10, the method for assembling a double-deck vehicle body using the above-mentioned double-deck car body assembly system. The method for assembling a double-deck vehicle body includes:

S101: Install a vehicle body chassis on the vehicle body chassis support, cause both ends of the vehicle body chassis to be supported by and in contact with the ends of the vehicle body chassis support, and the middle of the vehicle body chassis to be supported by and in contact with the intermediate support of the vehicle body chassis support.

S102: Arrange the upper floor support in a recessed portion of the vehicle body chassis.

S103: Arrange side walls on both sides of the vehicle body chassis, and an upper floor between the two side walls.

S104: Adjust the height of the upper floor support, so that an upper surface of the upper floor support is in close fit with a lower surface of the upper floor.

S105: Install a vehicle roof on the top of the side walls, and adjust the height of a first carriage deck and a second carriage deck.

S106: Remove the upper floor support.

Further, in order to ensure that the upper floor is uniformly loaded during the installation process, the quantity of the upper floor supports 2 in step S102 is three, and the three upper floor supports are respectively arranged at both ends and the middle of the lower recess of the vehicle body chassis.

According to the method for assembling a double-deck vehicle body of the present disclosure, during the assembly process of the double-deck vehicle body chassis, the vehicle body chassis support can stabilize the vehicle body chassis and provide a good support for the installation of other components. The upper floor support connects the vehicle body chassis and the upper floor during the assembly process of the double-deck vehicle body, thereby supporting the upper floor and ensuring the strength and rigidity of the cross section of the vehicle body. Moreover, the upper floor support is easy to be installed and removed, and enables changing the width and height of the upper floor support according to the size of the vehicle body structure, so as to meet the requirements of vehicle bodies of various dimensions.

Finally, it should be noted that the above embodiments are only used to illustrate, rather than to limit, the technical solution of the present disclosure. Although the present disclosure has been described in detail with reference to the foregoing embodiments, those skilled in the art should understand that: the technical solutions described in the foregoing embodiments can still be modified, or some or all of the technical features can be equivalently replaced, and these modifications or replacements do not deviate the essence of the corresponding technical solutions from the scope of the technical solution of the embodiments.

What is claimed is:

1. A system for assembling a double-deck vehicle body, comprising: a vehicle body chassis support and upper floor supports, wherein:

the vehicle body chassis support comprises crossbeams, end supports, and an intermediate support, wherein the end supports are arranged separately at two ends of the crossbeams, the intermediate support is arranged at the middle of the crossbeams, a height of the end supports is greater than a height of the intermediate support, an upper surface of the end supports and an upper surface of the intermediate support are configured to be closely fitted to a lower surface of a vehicle body chassis; and the upper floor supports are adapted to be detachably arranged on the vehicle body chassis and support an upper floor of the vehicle body, wherein each upper floor support comprises a chassis connection frame, intermediate support frames, and upper support frames, and a width of the chassis connection frame is smaller than a width of the vehicle body.

2. The system for assembling a double-deck vehicle body according to claim 1, wherein an upper part of each end support is arranged with a height adjustable screw.

3. The system for assembling a double-deck vehicle body according to claim 1, wherein the crossbeams comprises a first crossbeam and a second crossbeam arranged in parallel, and a plurality of connection crossbeams arranged in parallel between the first crossbeam and the second crossbeam; and
the intermediate support is arranged on the connection crossbeams, the end supports are separately arranged on two ends of the first crossbeam and two ends of the second crossbeam.

4. The system for assembling a double-deck vehicle body according to claim 1, wherein:
the chassis connection frame comprises a first upper frame and a first lower frame, which are connected through a first column, an end of the first upper frame is connected with an end of the first lower frame through a first reinforcing plate, a stiffening plate is arranged between the first upper frame and the first column, a connection block is arranged on a bottom of the first lower frame, a first connection plate is arranged on an upper part of the first upper frame, and a connection hole is arranged on the first connection plate;
a quantity of the intermediate support frames is two, which are separately located at two ends of an upper surface of the chassis connection frame, each intermediate support frame comprises a second upper frame and a second lower frame, which are connected through second columns, a reinforcing rib is arranged between the second columns, a second reinforcing plate is arranged between the second column and the second upper frame, and between the second column and the second lower frame, a second connection plate is arranged at a lower part of the second lower frame, a third connection plate is arranged at an upper part of the second upper frame, and the second connection plate and the third connection plate are arranged with a connection hole;
one of said upper support frames is arranged on each intermediate support frame, and each upper support frame comprises a fourth connection plate, an intermediate bracket, and a screw, wherein the fourth connection plate comprises a bottom plate and a side plate, the bottom plate is arranged with a connection hole, the side plate is arranged with a groove, the intermediate bracket comprises a support plate, and fifth connection plates located on both sides of the support plate, and the support plate engages with the groove of the side plate, and the screw is connected to the fifth connection plate through a bent connection plate.

5. The system for assembling a double-deck vehicle body according to claim 4, wherein the fourth connection plate and the intermediate bracket are arranged with a weight reduction circular hole.

6. The system for assembling a double-deck vehicle body according to claim 1, wherein each upper floor support is adapted to engage with a recessed portion of the vehicle body chassis.

7. The system for assembling a double-deck vehicle body according to claim 6, wherein the quantity of the upper floor supports is three.

8. The system for assembling a double-deck vehicle body according to claim 7, wherein the three upper floor supports are adapted to engage with both ends and a middle portion, respectively, of a recessed portion of the vehicle body chassis.

9. A method for assembling a double-deck vehicle body, wherein the method involves using a system for assembling a double-deck vehicle body according to claim 1, and the method comprises:
installing a vehicle body chassis on the vehicle body chassis support, so that both ends of the vehicle body chassis are supported by and in contact with ends of the vehicle body chassis support, and a middle of the vehicle body chassis is supported by and in contact with the intermediate support of the vehicle body chassis support;
arranging each upper floor support in a recessed portion of the vehicle body chassis;
arranging side walls on both sides of the vehicle body chassis, and an upper floor between two side walls;
adjusting heights of the upper floor supports, so that an upper surface of the upper floor supports is closely fitted to a lower surface of the upper floor;
installing a roof on top of the side walls, and adjusting heights of a first carriage deck and a second carriage deck; and
removing the upper floor supports.

10. The method for assembling a double-deck vehicle body according to claim 9, wherein the quantity of the upper floor supports is three, and the arranging each upper floor support in a recessed portion of the vehicle body chassis comprises:
arranging the three upper floor supports at both ends and a middle, respectively, of the recessed portion of the vehicle body chassis.

* * * * *